US012602317B2

(12) United States Patent
Narum et al.

(10) Patent No.: US 12,602,317 B2
(45) Date of Patent: Apr. 14, 2026

(54) MEMORY DEVICE HARDWARE HOST READ ACTIONS BASED ON LOOKUP OPERATION RESULTS

(71) Applicant: Micron Technology, Inc., Boise, ID (US)

(72) Inventors: Steven R. Narum, Meridian, ID (US); Ning Zhao, Milpitas, CA (US)

(73) Assignee: Micron Technology, Inc., Boise, ID (US)

( * ) Notice: Subject to any disclaimer, the term of this patent is extended or adjusted under 35 U.S.C. 154(b) by 135 days.

(21) Appl. No.: 17/820,201

(22) Filed: Aug. 16, 2022

(65) Prior Publication Data

US 2024/0061769 A1 Feb. 22, 2024

(51) Int. Cl.
*G06F 12/00* (2006.01)
*G06F 12/02* (2006.01)
*G06F 12/0891* (2016.01)
*G06F 13/16* (2006.01)

(52) U.S. Cl.
CPC ...... *G06F 12/0246* (2013.01); *G06F 12/0891* (2013.01); *G06F 13/1673* (2013.01)

(58) Field of Classification Search
CPC ............. G06F 12/1009; G06F 12/1018; G06F 12/1027; G06F 12/1036; G06F 12/1045; G06F 12/1054; G06F 12/1063; G06F 12/109; G06F 2212/651; G06F 2212/68; G06F 2212/681; G06F 2212/682; G06F 2212/683; G06F 2212/684; G06F 12/0246; G06F 12/0891; G06F 13/1673; G06F 2212/1016
See application file for complete search history.

(56) References Cited

U.S. PATENT DOCUMENTS

| | | | | |
|---|---|---|---|---|
| 11,042,481 B1* | 6/2021 | Virani | ................. | G06F 9/30047 |
| 2014/0013074 A1* | 1/2014 | Koka | ................. | G06F 12/1045 |
| | | | | 711/207 |
| 2014/0223137 A1* | 8/2014 | Alexander | .......... | G06F 12/1027 |
| | | | | 711/207 |
| 2018/0189180 A1* | 7/2018 | Fahim | ................. | G06F 12/0833 |
| 2020/0097413 A1* | 3/2020 | Raval | ................. | G06F 12/1045 |
| 2020/0387449 A1* | 12/2020 | Simionescu | ............ | G06F 3/061 |
| 2021/0019088 A1* | 1/2021 | Zhu | ..................... | G06F 11/1004 |
| 2021/0191870 A1* | 6/2021 | Virani | .................. | G06F 9/5022 |

* cited by examiner

*Primary Examiner* — Arvind Talukdar

(74) *Attorney, Agent, or Firm* — Harrity & Harrity, LLP

(57) ABSTRACT

Implementations described herein relate to memory device hardware host read actions based on lookup operation results. In some implementations, a memory device may include one or more components configured to receive, by a hardware component of the one or more components and from a host device, a request to read data. The hardware component may be configured to perform a first lookup operation to determine whether the data is associated with a write data entry in a cache memory. The hardware component may be configured to perform a second lookup operation associated with an address of the data in a memory, where the second lookup operation is performed irrespective of a first result of the first lookup operation. The hardware component may be configured to perform one or more actions based on the first result and a second result of the second lookup operation.

25 Claims, 9 Drawing Sheets

700

710 — Receive, by a hardware component and from a host device, a request to read data 720 — Perform, by the hardware component, a first lookup operation to determine whether the data is associated with a write data entry in a cache memory 730 — Perform, by the hardware component, a second lookup operation associated with an address of the data in a media memory, wherein the second lookup operation is performed irrespective of a first result of the first lookup operation 740 — Perform, by the hardware component, one or more actions based on the first result indicating that the data is associated with the write data entry in the cache memory and a second result of the second lookup operation indicating that the address of the data is invalid

300

Figure 5A:
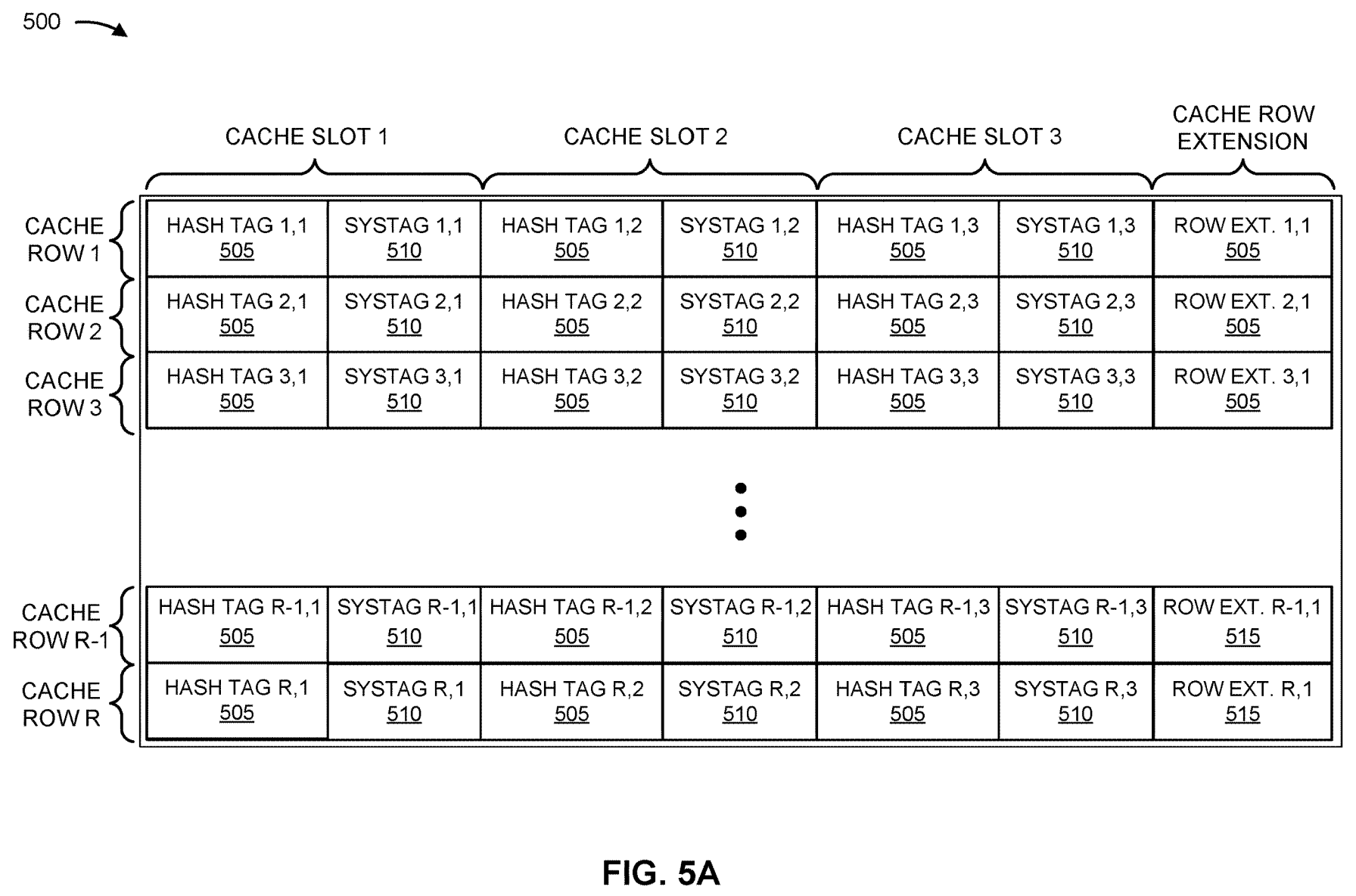

500

| | CACHE SLOT 1 | | CACHE SLOT 2 | | CACHE SLOT 3 | | CACHE ROW EXTENSION |
|---|---|---|---|---|---|---|---|
| CACHE ROW 1 | HASH TAG 1,1 505 | SYSTAG 1,1 510 | HASH TAG 1,2 505 | SYSTAG 1,2 510 | HASH TAG 1,3 505 | SYSTAG 1,3 510 | ROW EXT. 1,1 505 |
| CACHE ROW 2 | HASH TAG 2,1 505 | SYSTAG 2,1 510 | HASH TAG 2,2 505 | SYSTAG 2,2 510 | HASH TAG 2,3 505 | SYSTAG 2,3 510 | ROW EXT. 2,1 505 |
| CACHE ROW 3 | HASH TAG 3,1 505 | SYSTAG 3,1 510 | HASH TAG 3,2 505 | SYSTAG 3,2 510 | HASH TAG 3,3 505 | SYSTAG 3,3 510 | ROW EXT. 3,1 505 |
| | | | $\cdots$ | | | | |
| CACHE ROW R-1 | HASH TAG R-1,1 505 | SYSTAG R-1,1 510 | HASH TAG R-1,2 505 | SYSTAG R-1,2 510 | HASH TAG R-1,3 505 | SYSTAG R-1,3 510 | ROW EXT. R-1,1 515 |
| CACHE ROW R | HASH TAG R,1 505 | SYSTAG R,1 510 | HASH TAG R,2 505 | SYSTAG R,2 510 | HASH TAG R,3 505 | SYSTAG R,3 510 | ROW EXT. R,1 515 |

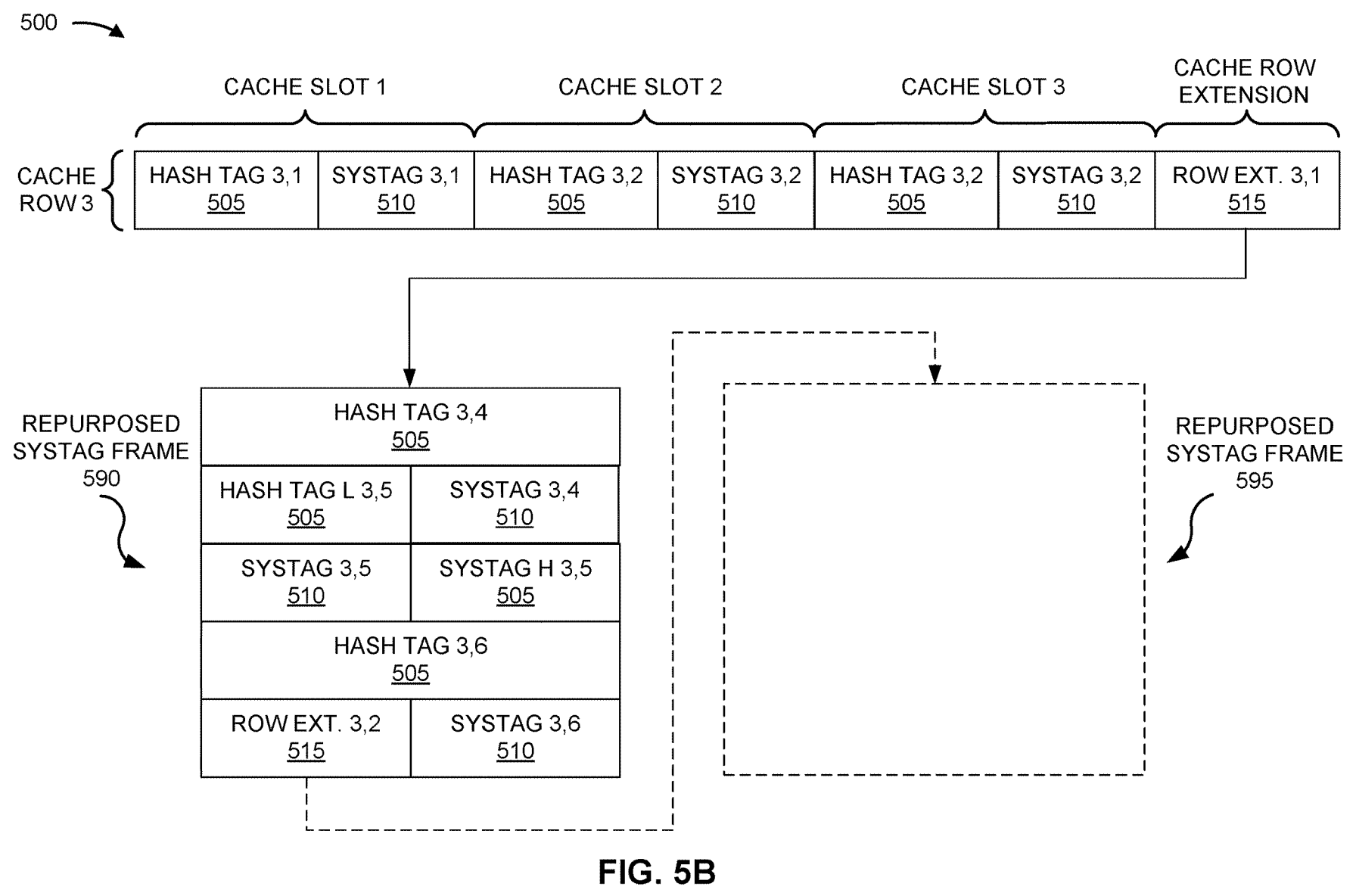

CACHE ROW 3

| CACHE SLOT 1 | | CACHE SLOT 2 | | CACHE SLOT 3 | | CACHE ROW EXTENSION |
|---|---|---|---|---|---|---|
| HASH TAG 3,1 505 | SYSTAG 3,1 510 | HASH TAG 3,2 505 | SYSTAG 3,2 510 | HASH TAG 3,2 505 | SYSTAG 3,2 510 | ROW EXT. 3,1 515 |

REPURPOSED SYSTAG FRAME 595

REPURPOSED SYSTAG FRAME 590

| HASH TAG 3,4 505 | SYSTAG 3,4 510 |
| HASH TAG L 3,5 505 | SYSTAG H 3,5 505 |
| SYSTAG 3,5 510 | HASH TAG 3,6 505 |
| ROW EXT. 3,2 515 | SYSTAG 3,6 510 |

FIG. 5B

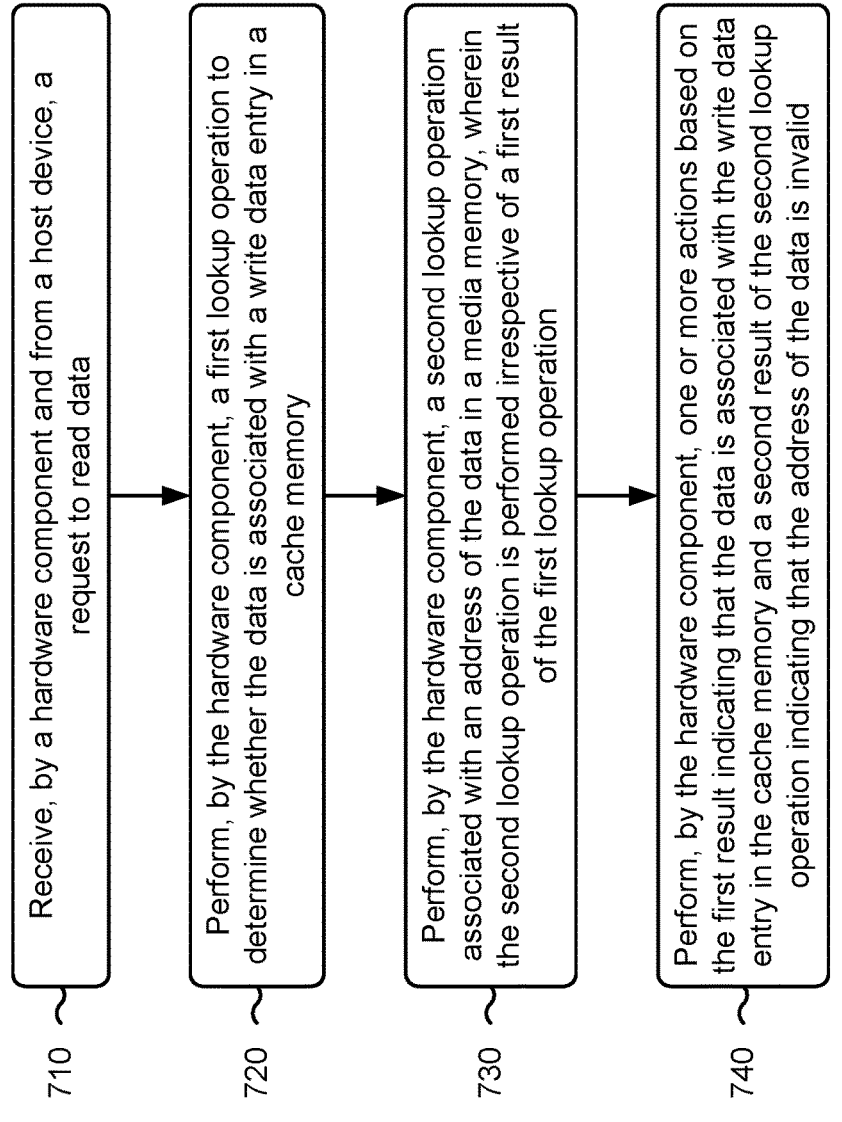

700

710 — Receive, by a hardware component and from a host device, a request to read data 720 — Perform, by the hardware component, a first lookup operation to determine whether the data is associated with a write data entry in a cache memory 730 — Perform, by the hardware component, a second lookup operation associated with an address of the data in a media memory, wherein the second lookup operation is performed irrespective of a first result of the first lookup operation 740 — Perform, by the hardware component, one or more actions based on the first result indicating that the data is associated with the write data entry in the cache memory and a second result of the second lookup operation indicating that the address of the data is invalid

FIG. 7

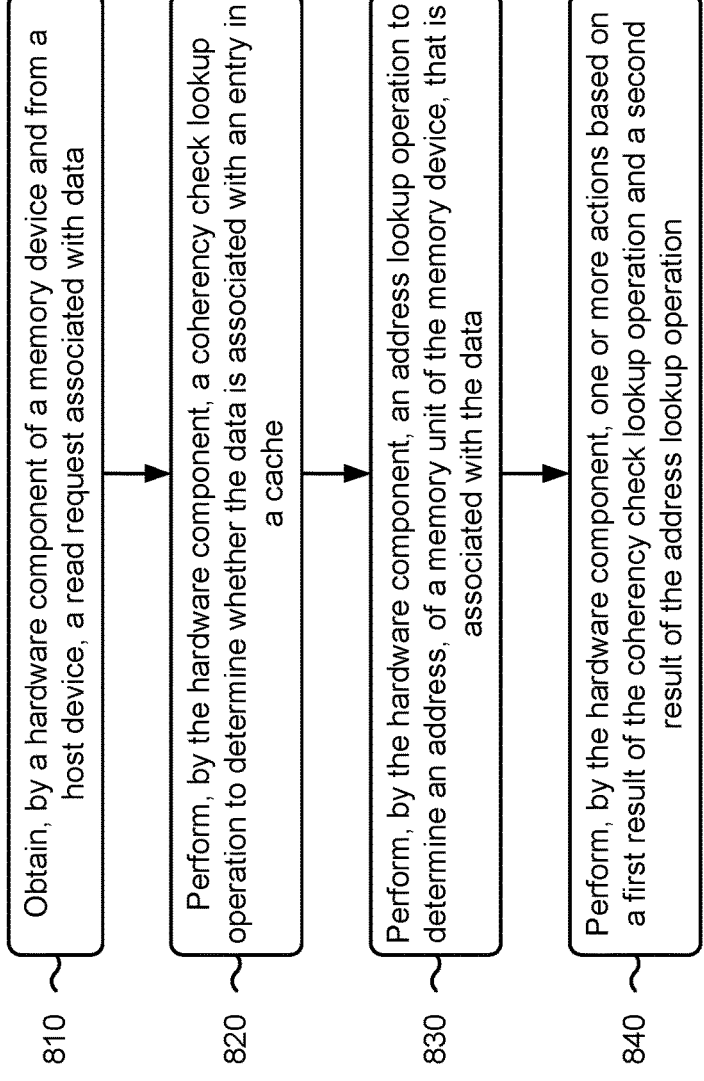

800

810 — Obtain, by a hardware component of a memory device and from a host device, a read request associated with data 820 — Perform, by the hardware component, a coherency check lookup operation to determine whether the data is associated with an entry in a cache 830 — Perform, by the hardware component, an address lookup operation to determine an address, of a memory unit of the memory device, that is associated with the data 840 — Perform, by the hardware component, one or more actions based on a first result of the coherency check lookup operation and a second result of the address lookup operation

FIG. 8

MEMORY DEVICE HARDWARE HOST READ ACTIONS BASED ON LOOKUP OPERATION RESULTS

TECHNICAL FIELD

The present disclosure generally relates to memory devices, memory device operations, and, for example, to memory device hardware host read actions based on lookup operation results.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

BRIEF DESCRIPTION OF THE DRAWINGS

FIGS. 5A and 5B are diagrams illustrating an example of a coherency check.

FIG. 7 is a flowchart of an example method associated with memory device hardware host read actions based on lookup operation results.

FIG. 8 is a flowchart of an example method associated with memory device hardware host read actions based on lookup operation results.

DETAILED DESCRIPTION

Figure 1:
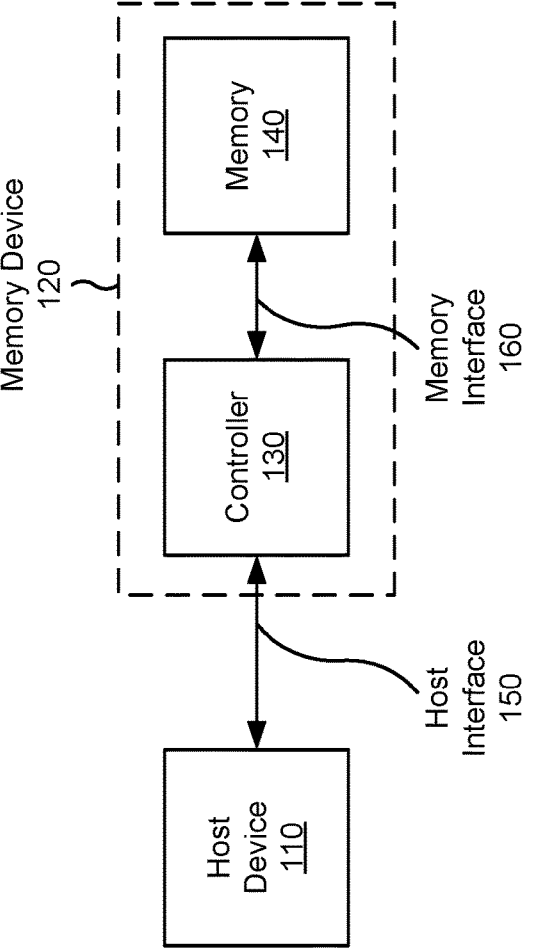
FIG. 1 is a diagram illustrating an example system capable of performing memory device hardware host read actions based on lookup operation results.

In some examples, a memory device (e.g., a controller of a memory device) may be associated with hardware components and firmware components. For example, the hard-ware component(s) may include hardware such as one or more integrated circuits, discrete components, and/or a buffer memory, among other examples. The hardware component(s) may include digital circuitry with dedicated (i.e., hard-coded) logic to perform the operations described herein. Firmware may be a type of program or software that provides control, monitoring, and data manipulation of the memory device. The firmware component(s) may include one or more instructions, code, and/or software, among other examples, that is configured to the executed by the controller. The firmware component(s) may be configured to control the operations of the controller in operating the memory device.

In some cases, one or more hardware components may be configured to perform operations associated with the memory device, such as read operations, write operations, and/or erase operations, among other examples, without executing firmware on the controller of the memory device. This may conserve processing time and/or processing resources, among other examples, that would have otherwise been used executing the firmware on the controller to perform the operations. However, in some cases, firmware instructions may be executed after an operation is performed by the hardware components to facilitate a read operation, a write operation, and/or an erase operation, among other examples, being completed by the memory device. Because firmware may be executed over time (e.g., in one or more processing cycles), this may introduce latency associated with completing various operations. Additionally, executing the firmware may consume processing resources.

For example, in a read operation, a coherency check and a logical block addressing (LBA) lookup may be performed as part of the read operation. For example, the coherency check may be associated with a lookup operation to determine whether a piece of data (e.g., a particular translation unit (TU)) is stored in a coherency cache buffer. For example, if a first write command spans a first set of TUs, and a read command is received for a second set of TUs that overlap the first set of TUs, then the overlapping TUs may be stored in the cache buffer to prevent the overlapping TUs from being read from the NAND memory before the overlapping TUs are actually written pursuant to the write command. The LBA lookup may be associated with a logical-to-physical (L2P) mapping table. The L2P mapping table may also be referred to as an LBA table or an LBA translation table. Each entry of the L2P mapping table maps an LBA address to a corresponding physical address of the data block on the memory device. The L2P mapping table may contain references or pointers to data that is physically stored in the memory device. When the L2P mapping table is updated based on a write command, the corresponding L2P entry will point to actual data stored in the memory device.

For example, as part of a read operation, a hardware component may perform a lookup operation for a coherency check. For example, the hardware component may perform a lookup operation in a coherency table to determine whether the data requested to be read by a host device is stored in a temporary cache memory (e.g., is temporarily cached in a volatile memory). For example, the lookup operation for the coherency check may return a "hit" if an identifier (e.g., a logical identifier) of the data is indicated in an entry of the coherency table. The lookup operation for the coherency check may return a "miss" if the identifier (e.g., the logical identifier) of the data is not indicated in an entry of the coherency table. If the lookup operation for the coherency check returns a "miss," then the hardware component may perform an LBA lookup to identify an L2P mapping associated with the data (e.g., to identify a physical location associated with the data in the memory). For example, the hardware component may perform a lookup operation in the L2P mapping table to identify information associated with the data (e.g., a physical location of the data in memory). The lookup operation in the L2P mapping table may return a "hit" if the data is associated with a valid physical location in the L2P mapping table (e.g., and is not deallocated). The lookup operation in the L2P mapping table may return a "miss" if the data is not associated with an entry in the L2P mapping table and/or if the entry associated with the data includes a deallocate-specific marker. For example, the memory device 120 and/or the host device 110 may deallocate portions of the memory address space from programs when the programs are no longer being executed by the host device 110.

In some examples, the lookup operation for the coherency check and the LBA lookup may be performed by the hardware component in series (e.g., with the hardware component(s) moving on to performing the LBA lookup only after receiving and/or interpreting a response associated with the lookup operation associated with the coherency check). For example, if the lookup operation for the coherency check returns a "hit," then the hardware component may provide an indication to a firmware component to obtain the data from the temporary cache memory. The firmware component may perform an LBA lookup based on receiving the indication to obtain the data from the temporary cache (e.g., to determine if the data is associated with a deallocation). The firmware component may obtain the data from the temporary cache memory and/or identify a deallocation associated with the data. The firmware component may provide an appropriate response (e.g., the data or a deallocation response) to the host device. However, the firmware component performing such operations may take several processing cycles, thereby consuming processing resources and/or processing time associated with processing the read command from the host device (e.g., thereby introducing latency associated with processing the read command).

As another example, if the LBA lookup performed by the hardware component returns a "miss," then the hardware component may provide an indication to the firmware component to interpret the response from the LBA lookup. This may enable the firmware component to take appropriate action based on the response from the LBA lookup. However, the firmware component performing such operations may take several processing cycles, thereby consuming processing resources and/or processing time associated with processing the read command from the host device (e.g., thereby introducing latency associated with processing the read command).

Some implementations described herein enable memory device hardware host read actions based on lookup operation results. For example, one or more hardware components of a memory device may be configured to perform a first lookup operation to determine whether data (e.g., associated with a read request or a read command) is associated with a write data entry in a cache memory (e.g., a coherency cache). The one or more hardware components may be configured to perform a second lookup operation associated with an address (e.g., an LBA address) of the data in a memory (e.g., to identify a physical location of the data in the memory). The one or more hardware components may be configured to (e.g., automatically without executing firmware) perform one or more actions based on the first result indicating that the data is associated with the write data entry in the cache memory and a second result of the second lookup operation indicating that the address of the data is invalidated (e.g., deallocated and/or unloaded).

In other words, as part of a read operation, the one or more hardware components may be configured to perform a coherency check lookup operation and an LBA lookup operation for data associated with the read operation in parallel (e.g., where the two operations are performed by the one or more hardware components irrespective of a result of the other operations). The one or more hardware components may be configured to perform different actions (e.g., automatically without executing firmware) based on the results of the coherency check lookup operation and the LBA lookup operation.

As a result, a processing time associated with the read operation may be reduced. Additionally, processing resources associated with performing the read operation may be conserved. For example, the one or more hardware components may be configured to perform one or more operations associated with the read operation (e.g., to facilitate and/or complete the read operation) without the memory device executing firmware instructions to facilitate and/or complete the read operation. This may conserve processing time and/or processing resources that would have otherwise been used to execute the firmware instructions to facilitate and/or complete the read operation.

FIG. 1 is a diagram illustrating an example system 100 capable of performing memory device hardware host read actions based on lookup operation results. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to perform one or more operations via hardware components of the memory device 120 and/or of the hardware controller 130 associated with a read operation (e.g., automatically without executing firmware). For example, the one or more hardware components may be configured to perform a coherency check lookup and an LBA lookup associated with a read command. The one or more hardware components may be configured to perform one or more actions (e.g., automatically without executing firmware) to facilitate and/or to complete the read operation.

As indicated above, FIG. 1 is provided as an example. Other examples may differ from what is described with regard to FIG. 1.

Figure 2:
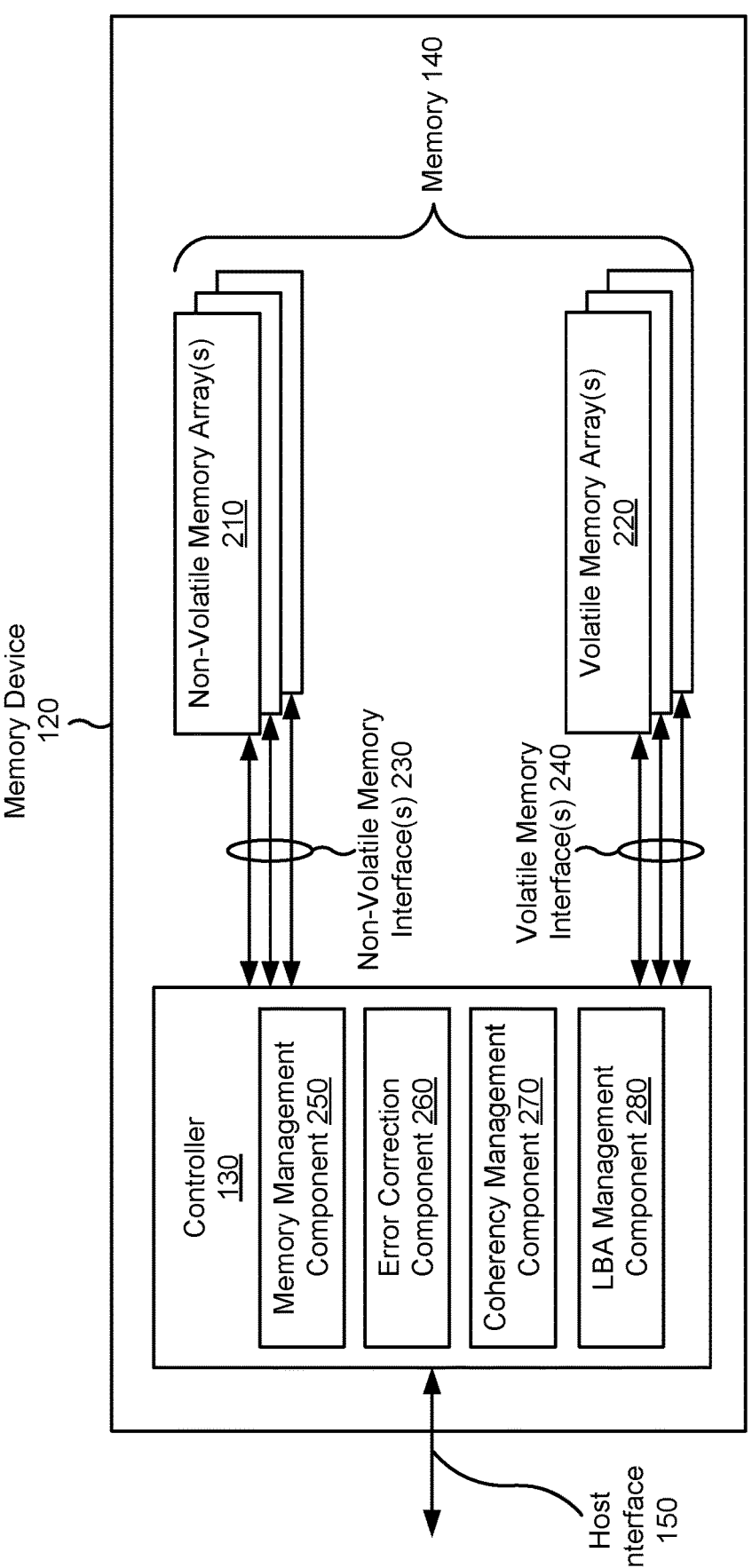
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, an error correction component 260, a coherency management component 270, and/or an LBA management component 280, among other examples. In some implementations, one or more of these components are implemented as one or more instructions (e.g., firmware) executed by the controller 130. Alternatively, one or more of these components may be implemented as dedicated integrated circuits distinct from the controller 130. In other words, the controller 130 may include one or more firmware components (e.g., instructions executed by the controller 130) and one or more hardware components (e.g., one or more dedicated integrated circuits).

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The error correction component 260 may be configured to detect and/or correct errors associated with the memory device 120. For example, the error correction component 260 may be configured to detect and/or correct an error associated with writing data to or reading data from one or more memory cells of a memory array, such as a single-bit error (SBE) or a multi-bit error (MBE).

The coherency management component 270 may be configured to perform one or more operations associated with a coherency check. For example, the coherency management component 270 may be configured to perform coherency operations for read and/or write commands. For example, if a first write command spans a first set of translation units (TUs), and a read command is received for a second set of TUs that overlap the first set of TUs, the coherency management component 270 may prevent the overlapping TUs from being read from the NAND memory before they are actually written pursuant to the write command. Thus, for each write operation, the coherency management component 270 may be configured to perform operations to update the mapping table for a TU, lock coherency for a TU, perform the write to the physical memory device(s), and release the coherency lock. Further, for each read operation, the coherency management component 270 may be configured to perform operations to check the coherency for the associated TUs to be read.

The LBA management component 280 may be configured to perform one or more operations associated with LBA, as described in more detail elsewhere herein. For example, the LBA management component 280 may be configured to map logical memory blocks to physical addresses of a memory unit. The LBA management component 280 may be configured to store information associated with one or more LBA addresses in a lookup table.

Figure 6:
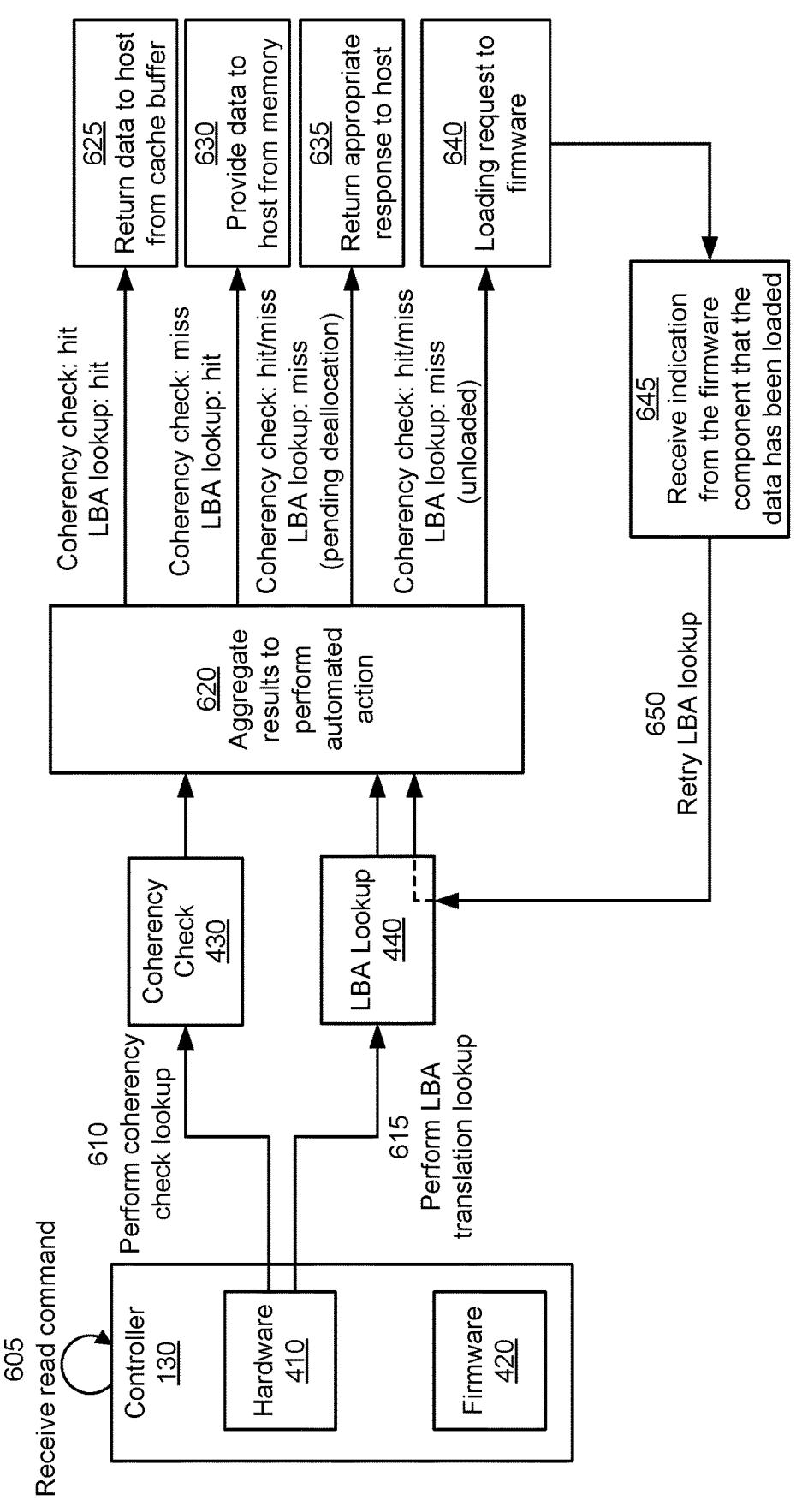
FIG. 6 is a diagram illustrating an example of memory device hardware host read actions based on lookup operation results.

One or more devices or components shown in FIG. 2 may be configured to perform operations described elsewhere herein, such as one or more operations of FIG. 6 and/or one or more process blocks of the methods of FIGS. 7 and 8. For example, the controller 130, the coherency management component 270, and/or the LBA management component 280, among other examples, may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
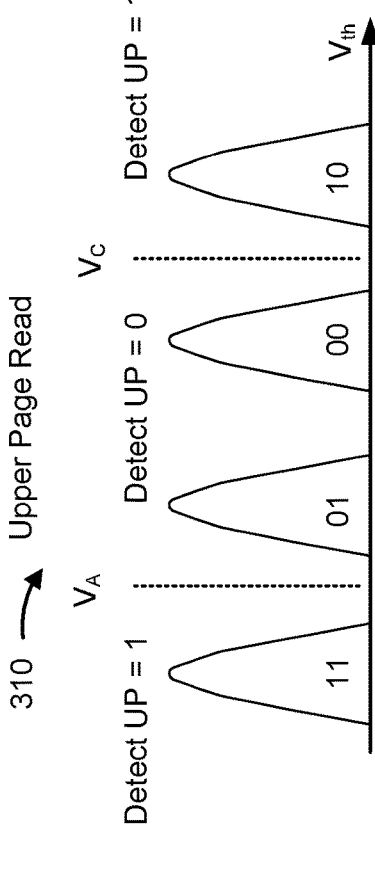
FIG. 3 is a diagram illustrating an example of read operations for an MLC non-volatile memory device.
Figure 3:
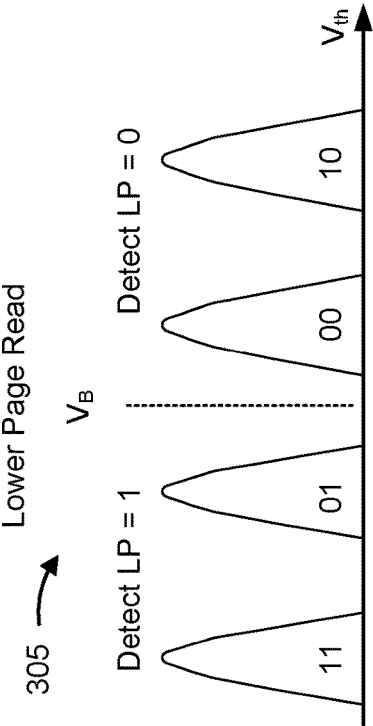

FIG. 3 is a diagram illustrating an example 300 of read operations for an MLC non-volatile memory device. Although the read operations described in connection with FIG. 3 are described in the context of an MLC, the described concepts also apply to other types of memory cells, such as SLCs, TLCs, QLCs, and other types of memory cells.

Some memory devices may be capable of storing multiple bits per memory cell. For example, an MLC non-volatile memory device (e.g., an MLC flash device) may be capable of storing two bits of information per memory cell in one of four states (e.g., may store binary 11, binary 01, binary 00, or binary 10 depending on a charge applied to the memory cell). To read the data of a memory cell, such as the MLC shown in FIG. 3, the memory device (or a component thereof) may apply a read reference voltage to the cell in an effort to induce current in the memory cell, and the memory device (or a component thereof) may determine a corresponding bit string associated with a voltage that induced (or else did not induce) current. Put another way, the memory device may apply various read reference voltages to sense the threshold voltage (Vth) associated with the data stored in the cell.

More particularly, for an MLC, the memory device may perform a lower page (also shown as LP) read and an upper page (also shown as UP) read. As shown by reference number 305, for a lower page read, the memory device may apply to a read reference voltage, shown as VB. VB may represent a voltage between threshold voltage distributions associated with the first two states (e.g., threshold voltage distributions associated with binary 11 and 01) and threshold voltage distributions associated with the second two states (e.g., threshold voltage distributions associated with binary 00 and 10). If current flows when VB is applied to the memory cell, then the threshold voltage may be considered to be less than VB, thus corresponding to one of binary 11 or binary 01 (meaning that the lower page data represents a "1"). If current does not flow when VB is applied to the memory cell, then the threshold voltage may be considered to be more than VB, thus corresponding to one of binary 00 or binary 10 (meaning that the lower page data represents a "0").

As shown by reference number 310, an upper page read may be performed in a similar manner. More particularly, when the detected lower page data is a "1", a read reference voltage of VA may be applied to the memory cell to thereafter determine the upper page data. VA may represent a voltage between a threshold voltage distribution associated with the first state (e.g., a threshold voltage distribution associated with binary 11) and a threshold voltage distribution associated with the second state (e.g., a threshold voltage distribution associated with binary 01). If current flows when VA is applied to the memory cell, then the threshold voltage may be considered to be less than VA, thus corresponding to binary 11 (meaning that the upper page data represents a "1"). If current does not flow when VA is applied to the memory cell, then the threshold voltage may be considered to be more than VA but less than VB (as determined during the lower page read), thus corresponding to binary 01 (meaning that the upper page data represents a "0").

Similarly, when the detected lower page data is a "0," a read reference voltage of VC may be applied to the memory cell to thereafter determine the upper page data. VC may represent a voltage between a threshold voltage distribution associated with the third state (e.g., a threshold voltage distribution associated with binary 00) and a threshold voltage distribution associated with the fourth state (e.g., a threshold voltage distribution associated with binary 10). If current flows when VC is applied to the memory cell, then the threshold voltage may be considered to be less than VC but more than VB (as determined during the lower page read), thus corresponding to binary 00 (meaning that the upper page data represents a "0"). If current does not flow when VC is applied to the memory cell, then the threshold voltage may be considered to be more than VC, thus corresponding to binary 10 (meaning that the upper page data represents a "1").

As indicated above, FIG. 3 is provided as an example. Other examples may differ from what is described with regard to FIG. 3.

Figure 4:
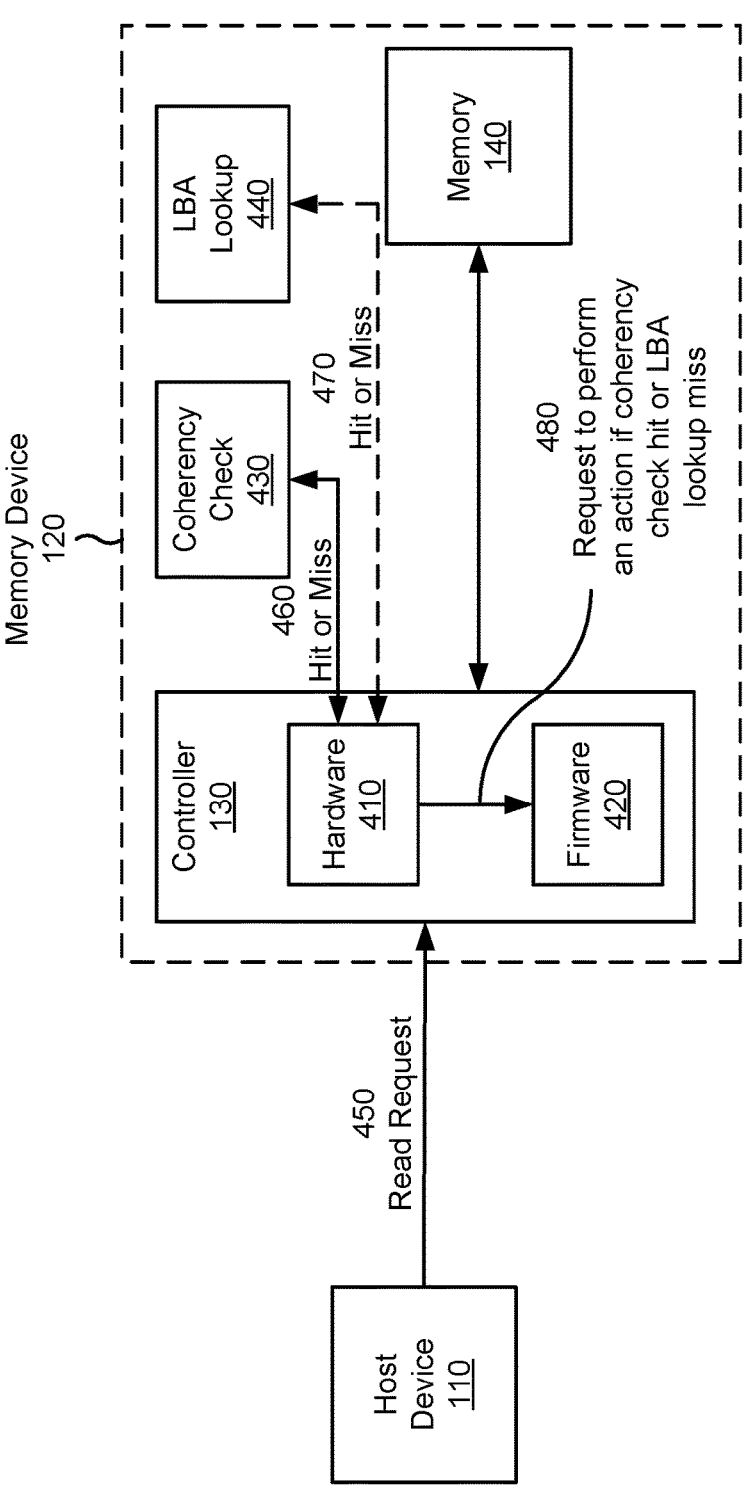
FIG. 4 is a diagram illustrating an example of read operations performed by a controller of a memory device.

FIG. 4 is a diagram illustrating an example 400 of read operations performed by a controller of a memory device. As shown in FIG. 4, the controller 130 (or another component of the memory device 120) may include a hardware component 410 and a firmware component 420. In some implementations, the hardware component 410 may be, may be part of, or may be included, in the host interface 150.

For example, the hardware component 410 may include hardware such as one or more integrated circuits, one or more application-specific integrated circuits (ASICs), discrete components, and/or a buffer memory, among other examples. The hardware component 410 may include digital circuitry with dedicated (i.e., hard-coded) logic to perform the operations described herein. Firmware, in general, may be a type of program or software that provides control, monitoring, and/or data manipulation of the memory device 120. The firmware component 420 may include one or more instructions, code, and/or software, among other examples, that is configured to the executed by the controller 130. The firmware component 420 may be configured to control the operations of the controller 130 in operating the memory device 120, such as the allocation of namespaces or LBA addresses for storing and accessing data in the memory device 120, among other examples.

In some implementations, the hardware component 410 may be configured to perform one or more operations described herein without receiving commands or instructions from the firmware component 420 (e.g., which may be referred to as automated hardware operations). In some implementations, the hardware component 410 may provide a request or command to the firmware component 420 to cause the firmware component 420 to perform one or more operations.

As shown in FIG. 4, a read operation may be associated with a coherency check 430. As described in more detail in connection with FIGS. 5A and 5B, the coherency check may be associated with a lookup operation to determine whether a piece of data (e.g., a particular translation unit (TU)) is stored in a coherency cache buffer. For example, if a first write command spans a first set of TUs, and a read command is received for a second set of TUs that overlap the first set of TUs, then the overlapping TUs may be stored in the cache buffer to prevent the overlapping TUs from being read from the NAND memory before the overlapping TUs are actually written pursuant to the write command. For example, if a coherency check lookup returns a "hit," then the controller 130 may determine that the piece of data associated with the lookup is stored in the coherency cache buffer. If a coherency check lookup returns a "miss," then the controller 130 may determine that the piece of data associated with the lookup is not stored in the coherency cache buffer.

In some examples, a block of data transferred during media management can be or can be referred to as a TU and can be the smallest size of data internally managed by the memory device 120, by the controller 130, and/or by the host device 110. A TU may correspond to a logical address (e.g., a TU address (TUA) or an LBA address) and a physical address (e.g., an abstracted physical address such as a flash logical address (FLA), which may relate to a physical address of the NAND cell referred to as a platform physical address (PPA)).

Physical memory elements of a storage device can be arranged as logical memory blocks addressed via LBA. A logical memory block may be the smallest LBA addressable memory unit. Each LBA address may identify a single logical memory block that can be mapped to a particular physical address of a memory unit in the memory device 120.

The concept of namespace for a storage device is similar to the concept of partition in a hard disk drive for creating logical storages. Different portions of the memory 140 can be allocated to different namespaces and thus can have LBA addresses configured independently from each other within their respective namespaces. Each namespace identifies a quantity of memory of the memory device 120 addressable via LBA. A same LBA address can be used in different namespaces to identify different memory units in different portions of the memory 140. For example, a first namespace allocated on a first portion of the memory 140 having n memory units can have LBA addresses ranging from 0 to n−1; and a second namespace allocated on a second portion of the memory 140 having m memory units can have LBA addresses ranging from 0 to m−1.

The host device 110 may send a request to the memory device 120 for the creation, deletion, or reservation of a namespace. After a portion of the storage capacity of the storage device is allocated to a namespace, an LBA address in the respective namespace logically represents a particular memory unit in the memory 140, although the particular memory unit logically represented by the LBA address in the namespace may physically correspond to different memory units at different time instances (e.g., as in SSDs). For example, a read command or a write command may indicate an LBA address and a namespace identifier associated with a unit of data. LBA translation may include translating the LBA address and the namespace identifier into a TU address. The TU address may be translated (e.g., via an L2P mapping table) into a physical address (e.g., an FLA) associated with a location of the unit of data in the memory 140 (e.g., the physical address may point to a die, plane, block, and/or page associated with the unit of data in the memory 140).

For example, in order to maintain the flow of commands, the memory device 120 may employ two tables that point to write data, which are implemented and maintained by the controller 130. A first table may be referred to as an L2P mapping table. The L2P mapping table may also be referred to as an LBA table or an LBA translation table. Each entry of the L2P mapping table maps an LBA address to a corresponding physical address of the data block on the memory device 120. The L2P mapping table may contain references or pointers to data that is physically stored in the memory device 120. When the L2P mapping table is updated based on a write command, the corresponding L2P entry will point to actual data stored in the memory device 120. By contrast, when the L2P mapping table is updated based on a deallocate command, the L2P mapping table will not point to data stored on a memory device, but instead will contain a deallocate-specific marker which results in zeros (and/or an error message) being sent back to the host device 110 in response to a subsequent read command.

The second table may be referred to as a "coherency table," which maintains information regarding outstanding write data that is temporarily cached in a volatile memory of the memory device 120. Upon updating the L2P mapping table and writing data to the memory 140 (e.g., to NAND memory), the corresponding write data can be evicted from the cache and cleared from the coherency table. Deallocate commands do not have actual data content, and instead only include LBA ranges to be deallocated. Because no data is actually transferred from the host device 110 with deallocate commands, there is no data to store in the cache memory, and the coherency table is not updated. Instead, the deallocate command bypasses the coherency table operation and the L2P mapping table is updated with the deallocate-specific marker indicating that there is no data to be written to the memory device 120.

As shown in FIG. 4, and by reference number 450, the memory device 120 may receive a read request command from the host device 110. For example, the read request command may be a request to read a particular piece of data. The hardware component 410 may be configured to perform one or more operations based on receiving the read request command (e.g., automatically without processing by firmware component 420). In other words, the hardware component 410 may be configured to perform one or more operations without the controller 130 executing software and/or instructions (e.g., the firmware component 420). The read command may indicate an LBA address and/or a namespace identifier associated with the data to be read.

As shown by reference number 460, the hardware component 410 may perform a lookup operation for the coherency check 430. For example, the hardware component 410 may perform a lookup operation in the coherency table to determine whether the data requested to be read by the host device 110 is stored in a temporary cache memory (e.g., is temporarily cached in a volatile memory). For example, the lookup operation for the coherency check 430 may return a "hit" if an identifier (e.g., a logical identifier) of the data is indicated in an entry of the coherency table. The lookup operation for the coherency check 430 may return a "miss" if the identifier (e.g., the logical identifier) of the data is not indicated in an entry of the coherency table.

As shown by reference number 470, if the lookup operation for the coherency check 430 returns a "miss," then the hardware component 410 may perform an LBA lookup 440 to identify an L2P mapping associated with the data (e.g., to identify a physical location associated with the data in the memory 140). For example, the hardware component 410 may perform a lookup operation in the L2P mapping table to identify information associated with the data (e.g., a physical location of the data in the memory 140). The lookup operation in the L2P mapping table may return a "hit" if the data is associated with a valid physical location in the L2P mapping table (e.g., and is not deallocated). The lookup operation in the L2P mapping table may return a "miss" if the data is not associated with an entry in the L2P mapping table and/or if the entry associated with the data includes a deallocate-specific marker.

In some examples, the lookup operation for the coherency check 430 and the LBA lookup 440 may be performed by the hardware component 410 in series (e.g., moving on to performing the LBA lookup 440 only after receiving and/or interpreting a response associated with the lookup operation associated with the coherency check 430). In other words, the hardware component 410 may first perform the lookup operation for the coherency check 430. Only if the lookup operation for the coherency check 430 returns a "miss" does the hardware component 410 perform the LBA lookup 440. For example, as shown by reference number 480, the hardware component 410 may provide an indication or a request to the firmware component 420 to perform an action if the lookup operation for the coherency check 430 returns a "hit" and/or if the LBA lookup 440 returns a "miss."

For example, if the lookup operation for the coherency check 430 returns a "hit," then the hardware component 410 may provide an indication to the firmware component 420 to obtain the data from the temporary cache memory. The firmware component 420 may perform an LBA lookup 440 based on receiving the indication to obtain the data from the temporary cache (e.g., to determine if the data is associated with a deallocation). The firmware component 420 may obtain the data from the temporary cache memory and/or identify a deallocation associated with the data. The firmware component 420 may provide an appropriate response (e.g., the data or a deallocation response) to the host device 110. However, the firmware component 420 performing such operations may take several processing cycles, thereby consuming processing resources and/or processing time associated with processing the read command from the host device 110 (e.g., thereby introducing latency associated with processing the read command).

As another example, if the LBA lookup 440 performed by the hardware component 410 returns a "miss," then the hardware component 410 may provide an indication to the firmware component 420 to interpret the response from the LBA lookup 440. This may enable the firmware component 420 to take appropriate action based on the response from the LBA lookup 440. For example, if the response from the LBA lookup 440 indicates that the data has been deallocated, then the firmware component 420 may determine an appropriate deallocation response to provide to the host device 110. As another example, if the response from the LBA lookup 440 indicates that the physical location associated with the data has not been loaded (e.g., written with the data), then the firmware component 420 may be configured to cause the physical location to be programmed with the data. However, the firmware component 420 performing such operations may take several processing cycles, thereby consuming processing resources and/or processing time associated with processing the read command from the host device 110 (e.g., thereby introducing latency associated with processing the read command).

As indicated above, FIG. 4 is provided as an example. Other examples may differ from what is described with regard to FIG. 4.

FIGS. 5A and 5B are diagrams illustrating an example 500 of a coherency check. For example, FIG. 5A is a diagram of an example cache structure of a coherency cache. FIG. 5B is a diagram of an example cache row extension of the cache structure. For example, FIGS. 5A and 5B illustrate examples of a coherency table that may be used by the coherency check 430 and/or operations performed by the coherency check 430 to determine whether a lookup is a "hit" or a "miss." In some implementations, other coherency check operations or tables may be used by the memory device 120.

As shown in FIG. 5A, the cache structure may be a three-way associative cache having R rows, each row containing three slots. The three-way structure allows the coherency check 430 to handle up to three collisions without penalty. Other cache structures may also be used. Each cache slot may include two fields, a hash tag field 505 and a system tag (SYSTAG) field 510. The SYSTAG field 510 stores a SYSTAG identifier (e.g., the address of the SYSTAG frame associated with an in-process operation), and the hash tag field 505 stores a hash value of a logical address to identify which of many possible memory locations that use a given cache row is contained within the slot (e.g., if any). The labeling notation of the hash tag and SYSTAG fields refers to the cache slot and row of the entry in the cache structure (e.g., hash tag 1,1 refers to the hash tag field 505 in the first row of the first slot; SYSTAG R-1,3 refers to the hash tag field 505 in the R−1 row of the third slot). In some implementations, the coherency check 430 can use a row extension as described in further detail below with reference to FIG. 5B to handle more than three collisions. Each row may include a row extension field 515. The labeling notation of the row extension field refers to the row and extension number (e.g., row extension 3,1 refers to the first row extension of the third row).

Functions can be used to calculate the row which would include a colliding entry, if any, and the hash tag that identifies which of many possible memory locations that use a given cache row is contained within the slot. The functions can compute the row and hash tag based on the logical address associated with a SYSTAG. Each time that logical address is used in a command (e.g., in a lookup command, such as a lookup associated with the coherency check 430), the coherency check 430 checks the row associated with that logical address. For example, a modulo function can be used to calculate a hash row from the logical address (e.g., logical address % R) and a bit-shift function can be used to calculate the hash tag (e.g., logical address.gtoreq.log.sub.2R).

As shown in FIG. 5B, a cache row extension of the example cache structure of FIG. 5A may be employed by the coherency check 430. As indicated above, the 3-way associative cache allows for up to three collisions within a group of addresses that hash to a particular row without penalty. To avoid operation blocking when greater than three collisions within a group of addresses occur, the row can be extended as shown using the row extension field 515. The row extension field can be used to identify additional slots in memory, such as through the use of repurposed SYSTAG frames that are allocated by the same memory management process that provides the memory subsystem with SYSTAG frames for operations but re-used to track collisions, thereby avoiding the need to introduce another memory management process or modify an existing memory management process. The value in the row extension field 515 can be encoded to indicate whether there is a row extension (e.g., whether cache row 3 points to a row extension in the repurposed SYSTAG frame 590, or whether the repurposed SYSTAG frame 590 points to the repurposed SYSTAG frame 595). In some implementations, the memory footprint of a SYSTAG frame allows for the inclusion of multiple additional slots and another row extension field to point to another extension, if needed. As shown, the repurposed SYSTAG frame includes three additional slots. The first row extension field 515 of row 3 points to a repurposed SYSTAG frame 590 that includes slots 4, 5, and 6 and a second row extension field

515 that points to a repurposed SYSTAG frame 595. Because a repurposed SYSTAG frame includes three slots, the number of memory accesses to check for collisions increases by one for each additional three pending operation collisions, assuming each of the slots within the repurposed SYSTAG frame(s) are valid (e.g., one memory access to the coherency cache for up to three collisions, one additional memory access to fetch the repurposed SYSTAG frame for up to six collisions).

The coherency check 430 may calculate rows and hash tags from the logical address associated with an operation. For example, in the case of a non-colliding write operation, the coherency check 430 receives a logical address and a SYSTAG, calculates the value of the hash tag and determines which cache row of the cache structure to use based on the logical address, and inserts the value of the hash tag and the SYSTAG identifier into the respective fields 505, 510 of an available slot in the row. In some implementations, the coherency check 430 can receive a range of logical addresses and corresponding list of SYSTAGs to be inserted into the cache structure. If the row of a cache structure is full, the coherency check 430 can employ the row extension field to expand the row. As the row and row extensions fill, the coherency check 430 can chain row extensions together as needed. In the case of a read operation, the coherency check 430 receives a logical address or a range of logical addresses and responds with a list of SYSTAGs that were hit. The coherency check 430 can calculate the row and hash tag for each of the logical addresses within the range to locate hits within the cache structure.

As indicated above, FIGS. 5A and 5B are provided as examples. Other examples may differ from what is described with regard to FIGS. 5A and 5B.

FIG. 6 is a diagram illustrating an example 600 of memory device hardware host read actions based on lookup operation results. As shown in FIG. 6, the memory device 120 may include the controller 130, the hardware component 410 (e.g., one or more hardware components), the firmware component 420 (e.g., one or more firmware components).

As shown by reference number 605, the controller 130 may receive, from the host device 110 (e.g., not shown in FIG. 6), a read command. For example, the memory device 120 and/or the controller 130 may receive a request to read data (e.g., a read command). In some implementations, the read command may indicate a logical address (e.g., an LBA address and/or a namespace identifier) associated with the data. In some implementations, the hardware component 410 may receive or obtain the read command.

In some implementations, based on receiving or obtaining the read command, the hardware component 410 may perform one or more operations. For example, the one or more operations may be automated operations that are performed by one or more hardware components without executing instructions (e.g., firmware) on the controller 130 and/or the memory device 120. In other words, the hardware component 410 may perform one or more automated actions to handle or facilitate a completion of the read command.

For example, as shown by reference number 610, the hardware component 410 may perform a first lookup operation to determine whether the data (e.g., indicated by the read command) is associated with a write data entry in a cache memory. For example, the first lookup operation may be associated with a coherency check operation. In other words, the hardware component 410 may perform a coherency check lookup operation to determine whether the data is associated with an entry in a cache memory. For example, the hardware component 410 may query a table (e.g., a coherency table) using a logical identifier associated with the data (e.g., an LBA address and/or a namespace identifier) . The query (e.g., and/or the coherency management component 270) may return a result of the coherency check lookup operation.

For example, the first lookup operation (e.g., the coherency check lookup operation) may be associated with a first result. In some implementations, the first result may indicate a miss or a hit. The first result indicating a miss may be associated with a write entry associated with the data not being stored in a cache associated with the memory device 120. In other words, if the first result is a miss, then the hardware component 410 may determine that the data to be read (e.g., as indicated by the read command) is not stored in a temporary cache memory associated with the coherency operation. The first result indicating a hit may be associated with a write entry associated with the data being stored in a cache associated with the memory device 120. For example, if the first result is a hit, then the hardware component 410 may determine that the data to be read (e.g., as indicated by the read command) is stored in the temporary cache memory associated with the coherency operation, as described in more detail elsewhere herein.

As shown by reference number 615, the hardware component 410 may perform a second lookup operation associated with an address (e.g., a physical address, such as an FLA) of the data in a memory (e.g., in the memory 140). For example, the hardware component 410 may perform a second lookup operation associated with identifying a physical address of the data in a memory (e.g., in the memory 140). In some implementations, the second lookup operation may be associated with an LBA lookup operation, as described in more detail elsewhere herein.

For example, as described in more detail elsewhere herein, the controller 130 can maintain an LBA table (e.g., an L2P mapping table). The LBA table can store the physical page address of pages in the memory 140 and may include corresponding logical addresses (e.g., LBA addresses or TU addresses) to the physical page addresses. The LBA table can be indexed by the LBA address that is contained in an associated command (or by a TU address corresponding to the LBA address). The LBA table can be used to look-up physical page addresses that correspond to logical block addresses where corresponding information is stored.

For example, the hardware component 410 may perform a logical address lookup operation to determine a physical address, of a memory unit of the memory device (e.g., a page of the memory 140), that is associated with the data. For example, the hardware component 410 may query an L2P table (e.g., associated with the LBA management component 280) using the LBA, namespace identifier, and/or TU address of the data to be read. The lookup operation may return a result (e.g., a second result) (e.g., the physical address and/or a code indicating the physical address and additional information associated with the physical address). For example, the result may indicate a hit or a miss, as described elsewhere herein. For example, the second result indicating a miss may be associated with the address (e.g., the physical address and/or the logical address) associated with the data being invalid (e.g., deallocated or not written to physical memory). The second result indicating a hit may be associated with the address indicating a storage location (e.g., a page in the memory 140) of the data. For example, a hit may indicate an FLA that can be provided to a backend of the memory device 120 to obtain the data (e.g., to read the data from a page) from the memory 140 (e.g., as described in more detail in connection with FIG. 3).

In some implementations, the result may indicate a code or a status field that indicates a reason for returning a miss. In some implementations, the hardware component 410 may be configured to interpret the code to identify the reason for the LBA lookup operation (e.g., an LBA translation operation) returning a miss. For example, one or more bits in a code returned as part of the LBA lookup operation may indicate a loaded status of the physical address associated with the data (e.g., indicating that the physical address is loaded or unloaded). As another example, one or more bits in the code returned as part of the LBA lookup operation may indicate a deallocation and/or a reason for deallocation, as described in more detail below. For example, an LBA lookup operation may return a miss based on the physical address associated with the data being unloaded (e.g., indicating that no data is stored at the physical address) and/or based on the physical address being deallocated (or pending deallocation).

In some implementations, the second lookup operation (e.g., the LBA lookup operation) may be performed irrespective of the first result of the first lookup operation (e.g., of the coherency check operation). For example, the coherency check lookup operation and the LBA lookup operation may be performed by the hardware component 410 in parallel. As used herein, performing the operations in "parallel" may refer to the hardware component 410 performing each operation independently and regardless of a result of the other operation after a command (e.g., a read command) is received. For example, when the hardware component 410 obtains a read command, the hardware component 410 may perform the coherency check lookup operation and the LBA lookup operation of the data that is requested to be read.

For example, the first result (e.g., of the coherency check lookup operation) may indicate that the data is associated with the entry in the cache (e.g., may indicate a hit for the logical address of the data). The hardware component 410 may refrain from providing an indication to a firmware component of the memory device based on the first result indicating that the data is associated with the entry in the cache. The hardware component 410 may perform the LBA lookup operation (e.g., even though the coherency check lookup operation returned a hit). This may enable the hardware component 410 to perform one or more actions (e.g., automated actions) to resolve and/or facilitate completion of the read command (e.g., thereby conserving time and/or processing resources associated with processing the read command).

In some implementations, the hardware component 410 may be configured to perform the first lookup operation (e.g., the coherency check lookup) and the second lookup operation (e.g., the LBA lookup) in a single lookup operation. For example, the hardware component 410 may perform the steps or operations described in connection with reference number 610 and reference number 615 in a single lookup operation. In other words, the hardware component 410 may be configured to perform one lookup operation to determine a coherency cache location, a coherency cache status, and NAND location (e.g., physical memory address) of a given piece of data (e.g., of a given TU).

As shown by reference number 620, the hardware component 410 may aggregate results from the coherency check lookup operation and from the LBA lookup operation. For example, the hardware component 410 may compile the first result (e.g., of the coherency check lookup operation) and the second result (e.g., of the LBA lookup operation). This may enable the hardware component 410 to determine one or more actions to be performed (e.g., by the hardware component 410 and without intervention from the firmware component 420) to process the read command.

In some implementations, the hardware component 410 may perform one or more actions based on a first result of the coherency check lookup operation and a second result of the LBA lookup operation. For example, the first result and/or the second result may include an indication of a code (e.g., an FLA code, a status code, or another code). The one or more actions performed by the hardware component may be based on the code. For example, the one or more actions may include providing, to the host device 110 associated with the read request, a deallocation response based on the first result indicating a miss and the second result indicating a miss, providing, to the host device 110, the data based on the first result indicating a hit and the second result indicating a hit (e.g., providing the data from a cache memory associated with the coherency check), or providing, to the host device 110, the data based on the first result indicating a miss and the second result indicating a hit (e.g., providing the data from a the memory 140), among other examples. As described elsewhere herein, the means for performing the one or more actions may not include the firmware component 420 (e.g., the hardware component 410 may be configured to perform the one or more actions described herein without executing the firmware on the controller 130).

For example, as shown by reference number 625, the first result (e.g., of the coherency check lookup) may indicate a hit and the second result (e.g., of the LBA lookup) may indicate a hit. This may indicate that the data is associated with the entry in cache memory associated with the coherency check (e.g., based on the coherency check lookup returning a hit) and that the physical address that is associated with the data is valid (e.g., is written to (loaded) and/or is not deallocated).

In such example, the one or more actions may include providing, by the hardware component 410 and to the host device 110, the data from an address associated with the cache. In other words, the hardware component 410 may obtain or retrieve the data from the cache memory. The hardware component 410 may be configured to cause the data to be provided to the host device 110. For example, in cases where the data to be read by the memory device is stored in a cache memory associated with a coherency check and where the address associated with the data is not deallocated, the hardware component 410 may be configured to automatically provide or transmit the data from the cache memory to the host device 110 (e.g., without requiring the firmware component 420 to perform any actions to obtain the data from the cache memory). This may conserve processing time and/or resources associated with processing the read command.

As another example, and as shown by reference number 630, the first result (e.g., of the coherency check lookup) may indicate a miss and the second result (e.g., of the LBA lookup) may indicate a hit. This may indicate the data is associated with the write data entry in the cache memory that the address (e.g., the physical address) of the data is valid (e.g., is written to, is loaded, and/or is not deallocated). In such examples, the hardware component 410 may be configured to obtain the data from a physical storage location on the memory 140. For example, the LBA lookup may indicate a physical address associated with the data (e.g., an indication of a die, a plane, a block, and/or a page where the data is stored on the memory 140). The hardware component 410 may be configured to provide the physical address to a backend component. As a result, the hardware component 410 may be configured to obtain (e.g., from the backend component) the data that is read from the physical storage location on the memory 140. The hardware component 410 may be configured to automatically provide (e.g., transmit or send) the data from the memory 140 to the host device 110 (e.g., without requiring the firmware component 420 to perform any actions to obtain the data from the memory 140). This may conserve processing time and/or resources associated with processing the read command.

As another example, the hardware component 410 may be configured to perform one or more actions based on the first result (e.g., of the coherency check lookup operation) indicating that the data is associated with the write data entry in the cache memory (e.g., a hit associated with the coherency check) and a second result of the second lookup operation indicating that the address of the data is invalid (e.g., a miss associated with the LBA lookup operation). In other words, the hardware component 410 may be configured to automatically handle scenarios in which new data has been written to cache memory (e.g., but is not yet written to the memory 140 and/or to a non-volatile memory), but that the new data has been invalidated (e.g., as indicated by the miss associated with the LBA lookup operation) due to the allocation being deallocated and/or unloaded. Additionally, the hardware component 410 may be configured to perform one or more actions based on the first result (e.g., of the coherency check lookup operation) indicating that the data is not associated with the write data entry in the cache memory (e.g., a miss associated with the coherency check) and a second result of the second lookup operation indicating that the address of the data is invalid (e.g., a miss associated with the LBA lookup operation). In other words, the hardware component 410 may be configured to automatically handle scenarios in which data has been written to the memory 140, but that the data or the allocation has been invalidated (e.g., as indicated by the miss associated with the LBA lookup operation) due to the allocation being deallocated and/or unloaded.

For example, as shown by reference number 635, the first result (e.g., of the coherency check lookup operation) may indicate that the data is not associated with the entry in the cache (e.g., a miss) or may indicate that the data is associated with an entry in the cache (e.g., a hit). The second result may indicate a miss associated with the LBA lookup operation. For example, the miss may be based on a value associated with the second result being associated with a null value (e.g., a null pointer indicating that the address is not valid), a pending deallocation associated with the address of the data, and/or that the address is associated with an unloaded region of the memory unit (e.g., of the memory 140), among other examples.

As shown by reference number 635, when the miss associated with the LBA lookup is due to a pending deallocation associated with the address of the data, the hardware component 410 may be configured to provide, to the host device 110, a communication indicating an error associated with the read request or the read command. In some implementations, the pending deallocation may be based on an all-zeros write operation associated with the address that is initiated by the host device 110 (e.g., the host device 110 may cause the allocation to be deallocated), an all-zeros write operation initiated by the host device 110, and/or an uncorrectable error correction code (ECC) being associated with the address, among other examples.

The hardware component 410 may be configured to provide, to the host device 110, a deallocation response indicating that the address of the data has deallocated. In some implementations, the deallocation response may include an indication of an error associated with the request to read the data, random data, and/or an all zeros buffer (e.g., a response indicating bits that are all associated with a value of zero). In some implementations, the deallocation response may be only an error message. In some implementations, the deallocation response may be only an all zeros buffer. In some implementations, deallocation response may be an all zeros buffer with an error message. In some implementations, the deallocation response to be provided (e.g., when an address associated with data has been deallocated) may be configured by the host device 110 (e.g., the host device 110 may indicate the deallocation response that is expected by the host device 110 when an address associated with data has been deallocated).

In some implementations, the hardware component 410 may be configured to refrain from providing an indication, to the firmware component 420 of the memory device 120, indicating the pending deallocation associated with the address of the data. In other words, the hardware component 410 may provide, to the host device 110, the deallocation response based on the second result indicating a pending deallocation of the data that is requested to be read. For example, if the data is associated with a pending deallocation, then the host device may expect to receive the deallocation response (e.g., and not the data). By configuring the hardware component 410 to automatically provide the deallocation response in such scenarios, processing time and/or processing resources associated with processing the read command may be configured. Additionally, the hardware component 410 may be configured to provide the correct response (e.g., the deallocation response) in such scenarios.

As another example, and as shown by reference number 640, the second result indicates that the address of the data in the memory (e.g., in the memory 140) is unloaded. In other words, the second result (e.g., of the LBA lookup operation) may indicate that the physical location associated with the data (e.g., in the memory 140) has not been written with or programmed with data. In such examples, the hardware component 410 may be configured to cause the firmware component 420 to attempt to write the data to the physical location or the physical address. For example, the hardware component 410 may provide, to the firmware component 420, a request to load the data for the address (e.g., for the physical address associated with the data) and/or in a memory unit (e.g., a page) associated with the data.

For example, the hardware component 410 may provide, to the firmware component 420, an indication that the address associated with the data has been loaded. The indication may be a priority load indication (e.g., a load or write indication with a high priority). This may cause the firmware component 420 to perform one or more operations to write data to the physical address associated with the data.

As shown by reference number 645, the hardware component 410 may receive, from the firmware component 420, an indication that the data has been loaded by the firmware component 420 (e.g., to the physical address associated with the data in the memory 140). In some implementations, the firmware component 420 may complete the read operation by providing the data to the host device as part of the read operation.

In some other implementations, and as shown by reference number 650, the hardware component may be configured to perform another LBA lookup operation to determine the address and/or information associated with the address that is associated with the data. For example, the hardware component 410 may receive, from the firmware component, a trigger to perform another LBA lookup operation (e.g., a third lookup operation) after the firmware component has completed a load or write operation (e.g., a priority load operation) associated with the physical address that is associated with the data. For example, the hardware component 410 may be configured to automatically retry the LBA lookup operation after the firmware component has completed the load or the write operation.

The hardware component 410 may perform one or more actions based on a result of the other LBA lookup operation (e.g., the third lookup operation) after the firmware component has completed the load or the write operation associated with the physical address in a similar manner as described elsewhere herein. For example, based on the result of the retry of the LBA lookup operation, the hardware component 410 may perform one or more actions in a similar manner as described elsewhere herein. For example, the hardware component 410 may be configured to provide, to the host device, the data based on performing the other LBA lookup operation. In other words, because the data is now written to the physical address, the hardware component 410 may be enabled to cause the data to be obtained from the physical address and provided to the host device 110 (e.g., responsive to the read command).

As a result, a processing time associated with the read operation may be reduced. Additionally, processing resources associated with performing the read operation may be conserved. For example, the one or more hardware components may be configured to perform one or more operations associated with the read operation (e.g., to facilitate and/or complete the read operation) without the memory device executing firmware instructions to facilitate and/or complete the read operation. This may conserve processing time and/or processing resources that would have otherwise been used to execute the firmware instructions to facilitate and/or complete the read operation.

As indicated above, FIG. 6 is provided as an example. Other examples may differ from what is described with regard to FIG. 6.

FIG. 7 is a flowchart of an example method 700 associated with memory device hardware host read actions based on lookup operation results. In some implementations, a memory device (e.g., memory device 120) may perform or may be configured to perform one or more process blocks of FIG. 7. In some implementations, another device or a group of devices separate from or including the memory device (e.g., the host device 110, and/or the host interface 150) may perform or may be configured to perform one or more process blocks of FIG. 7. Additionally, or alternatively, one or more components of the memory device (e.g., the hardware component 410, the coherency management component 270, and/or the LBA management component 280) may perform or may be configured to perform one or more process blocks of FIG. 7.

As shown in FIG. 7, the method 700 may include receiving, from a host device, a request to read data (block 710). As further shown in FIG. 7, the method 700 may include performing a first lookup operation to determine whether the data is associated with a write data entry in a cache memory (block 720). As further shown in FIG. 7, the method 700 may include performing a second lookup operation associated with an address of the data in a memory, wherein the second lookup operation is performed irrespective of a first result of the first lookup operation (block 730). As further shown in FIG. 7, the method 700 may include performing one or more actions based on the first result indicating that the data is associated with the write data entry in the cache memory and a second result of the second lookup operation indicating that the address of the data is invalid (block 740).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIG. 6.

FIG. 8 is a flowchart of an example method 800 associated with memory device hardware host read actions based on lookup operation results. In some implementations, a memory device (e.g., memory device 120) may perform or may be configured to perform one or more process blocks of FIG. 8. In some implementations, another device or a group of devices separate from or including the memory device (e.g., the host device 110, and/or the host interface 150) may perform or may be configured to perform one or more process blocks of FIG. 8. Additionally, or alternatively, one or more components of the memory device (e.g., the hardware component 410, the coherency management component 270, and/or the LBA management component 280) may perform or may be configured to perform one or more process blocks of FIG. 8.

As shown in FIG. 8, the method 800 may include obtaining, from a host device, a read request associated with data (block 810). As further shown in FIG. 8, the method 800 may include performing a coherency check lookup operation to determine whether the data is associated with an entry in a cache (block 820). As further shown in FIG. 8, the method 800 may include performing a logical address lookup operation to determine an address, of a memory unit of the memory device, that is associated with the data (block 830). As further shown in FIG. 8, the method 800 may include performing one or more actions based on a first result of the coherency check lookup operation and a second result of the address lookup operation (block 840).

Although FIG. 8 shows example blocks of a method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel. The method 800 is an example of one method that may be performed by one or more devices described herein. These one or more devices may perform or may be configured to perform one or more other methods based on operations described herein, such as the operations described in connection with FIG. 6.

In some implementations, a memory device includes one or more components configured to: receive, by a hardware component of the one or more components and from a host device, a request to read data; perform, by the hardware component, a first lookup operation to determine whether the data is associated with a write data entry in a cache memory; perform, by the hardware component, a second lookup operation associated with an address of the data in a memory, wherein the second lookup operation is performed irrespective of a first result of the first lookup operation; and perform, by the hardware component, one or more actions based on the first result indicating that the data is associated with the write data entry in the cache memory and a second result of the second lookup operation indicating that the address of the data is invalid.

In some implementations, a method includes obtaining, by a hardware component of a memory device and from a host device, a read request associated with data; performing, by the hardware component, a coherency check lookup operation to determine whether the data is associated with an entry in a cache; performing, by the hardware component, a logical address lookup operation to determine an address, of a memory unit of the memory device, that is associated with the data; and performing, by the hardware component, one or more actions based on a first result of the coherency check lookup operation and a second result of the address lookup operation.

In some implementations, a system includes means for performing a coherency check operation responsive to a read request associated with data to determine whether the data is associated with an entry in a cache; means for performing a logical block addressing (LBA) lookup operation responsive to the read request to determine an address, of a memory unit, that is associated with the data, wherein the coherency check operation and the LBA lookup operation are performed in parallel; and means for performing one or more actions based on a first result of the coherency check operation and a second result of the LBA lookup operation, wherein the means for performing the one or more actions include at least one of: means for providing, to a host device associated with the read request, a deallocation response based on the first result indicating a miss and the second result indicating a miss, or means for providing, to the host device, the data based on the first result indicating a hit and the second result indicating a hit.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
    receive, by a hardware component of the one or more components and from a host device, a request to read data;
    perform, by the hardware component, a coherency check lookup operation to obtain a first result that indicates whether the data is stored in a coherency cache buffer;
    perform, by the hardware component, a logical block addressing (LBA) lookup operation to obtain a second result associated with an address of the data in a memory,
        wherein the LBA lookup operation is performed in parallel with the coherency check lookup operation and independently of the first result; and
    perform, by the hardware component, one or more actions to process the request based on the first result indicating that the data is stored in the coherency cache buffer and a second result of the LBA lookup operation indicating that the address of the data is invalid.

2. The memory device of claim 1,
wherein the second result indicates that the address of the data has been deallocated, and wherein the one or more actions include:
    providing, by the hardware component and to the host device, a deallocation response indicating that the address of the data has deallocated.

3. The memory device of claim 2,
wherein the deallocation response includes at least one of:
    an indication of an error associated with the request to read the data,
    random data, or
    an all zeros buffer.

4. The memory device of claim 1,
wherein the coherency check lookup operation and the LBA lookup operation are performed by the hardware component in a single lookup operation.

5. The memory device of claim 1,
wherein the second result indicates that the address of the data in the memory is unloaded, and
    wherein the one or more actions include:
        providing, by the hardware component and to a firmware component of the one or more components, a request to load the data for the address;
        receiving, by the hardware component and from the firmware component, an indication that the data has been loaded by the firmware component; and
        performing, by the hardware component, a lookup operation associated with the address of the data.

6. The memory device of claim 1,
wherein the second result indicates a code associated with the address of the data being invalidated, and
wherein the one or more actions are based on the code.

7. A method, comprising:
obtaining, by a hardware component of a memory device and from a host device, a read request associated with data;
performing, by the hardware component, a coherency check lookup operation to obtain a first result that indicates whether the data is stored in a coherency cache buffer;
performing, by the hardware component, a logical address lookup operation to obtain a second result that indicates an address, of a memory unit of the memory device, that is associated with the data,
    wherein the logical address lookup operation is performed in parallel with the coherency check lookup operation and independently of the first result; and
performing, by the hardware component, one or more actions to process the read request based on the first result and the second result.

8. The method of claim 7,
wherein the first result indicates that the data is stored in the coherency cache buffer,
wherein the second result indicates the address that is associated with the data, wherein the address is associated with the coherency cache buffer, and
wherein performing the one or more actions comprises:
    providing, by the hardware component and to the host device, the data from the address.

9. The method of claim 8,
wherein performing the one or more actions further comprises:
    refraining, by the hardware component, from providing an indication to a firmware component of the memory device based on the first result indicating that the data is stored in the coherency cache buffer.

10. The method of claim 7,
wherein the first result indicates that the data is not stored in the coherency cache buffer,
wherein the second result indicates a miss associated with the logical address lookup operation, and
wherein performing the one or more actions comprises:
    providing, by the hardware component and to the host device, a communication indicating an error associated with the read request.

11. The method of claim 10,
wherein the miss is based on at least one of:
    a value associated with the second result being associated with a null value,
    a pending deallocation associated with the address of the data, or
    that the address is associated with an unloaded region of the memory unit.

12. The method of claim 7,
wherein the second result indicates a pending deallocation associated with the address of the data, and
wherein performing the one or more actions comprises:
    refraining, by the hardware component, from providing an indication, to a firmware component of the memory device, indicating the pending deallocation associated with the address of the data; and
    providing, by the hardware component and to the host device, a deallocation response based on the second result.

13. The method of claim 12,
wherein the second result indicates that the pending deallocation is based on at least one of:
an all-zeros write operation associated with the address initiated by the host device, or
an uncorrectable error correction code (ECC) being associated with the address.

14. The method of claim 7,
wherein the second result indicates a pending deallocation associated with the address of the data due to an all-zeros write operation initiated by the host device, and
wherein performing the one or more actions comprises:
providing, by the hardware component and to the host device, a response to the read request indicating an all-zeros buffer based on the second result.

15. The method of claim 7,
wherein the second result indicates a pending deallocation associated with the address of the data due to an uncorrectable error correction code (ECC) being associated with the address, and
wherein performing the one or more actions comprises:
providing, by the hardware component and to the host device, a response to the read request indicating an error associated with the read request.

16. A system, comprising:
means for performing a coherency check operation, responsive to a read request associated with data, to obtain a first result that indicates whether the data is stored in a coherency cache buffer;
means for performing a logical block addressing (LBA) lookup operation, responsive to the read request, to obtain a second result that indicates an address, of a memory unit, that is associated with the data,
wherein the LBA lookup operation is performed independently of the first result, and
wherein the coherency check operation and the LBA lookup operation are performed in parallel; and
means for performing one or more actions to process the read request based on the first result and the second result, wherein the means for performing the one or more actions include at least one of:
means for providing, to a host device associated with the read request, a deallocation response based on the first result indicating a miss and the second result indicating a miss, or
means for providing, to the host device, the data based on the first result indicating a hit and the second result indicating a hit.

17. The system of claim 16,
wherein the means for performing the one or more actions does not include a firmware component associated with the system.

18. The system of claim 16,
wherein the first result indicating a miss is associated with the data not being stored in the coherency cache buffer, and
wherein the first result indicating a hit is associated with the data being stored in the coherency cache buffer.

19. The system of claim 16,
wherein the second result indicating a miss is associated with the address associated with the data being invalid, and
wherein the second result indicating a hit is associated with the address indicating a storage location of the data.

20. The system of claim 16,
wherein the second result indicates that the address is associated with an unloaded region of the memory unit, and
wherein the means for performing the one or more actions comprise:
means for providing, to a firmware component of the system, a request to load the data in the memory unit.

21. The system of claim 20,
wherein the means for performing the one or more actions further comprise:
means for receiving, from the firmware component, an indication that the address associated with the data has been loaded; and
means for performing another LBA lookup operation to determine the address that is associated with the data.

22. The system of claim 21,
wherein the means for performing the one or more actions further comprise:
means for providing, to the host device, the data based on performing the other LBA lookup operation.

23. The system of claim 16,
wherein the second result indicates a code associated with the address of the data being invalidated, and
wherein the one or more actions are based on the code.

24. The memory device of claim 4,
wherein the one or more components are further configured to:
determine, by the hardware component and based on the single lookup operation, a coherency cache location, a coherency cache status, and a physical memory address of the data.

25. The method of claim 7,
wherein the coherency check lookup operation and the logical address lookup operation are performed by the hardware component in a single lookup operation, the method further comprising:
determining, by the hardware component and based on the single lookup operation, a coherency cache location, a coherency cache status, and a physical memory address of the data.

* * * * *